United States Patent [19]
Patouraux et al.

[11] Patent Number: 5,794,408
[45] Date of Patent: Aug. 18, 1998

[54] INERTING PROCESS FOR PACKAGING COVERS AND DEVICES FOR CARRYING OUT SAID PROCESS

[75] Inventors: Andre Patouraux, Nethen; Philippe Patouraux, Grez-Boiceau, both of Belgium

[73] Assignee: Madpack-Servicos Internacionais, LDA, Funchal, Portugal

[21] Appl. No.: 648,086

[22] PCT Filed: Dec. 7, 1994

[86] PCT No.: PCT/BE94/00093

§ 371 Date: May 28, 1996

§ 102(e) Date: May 28, 1996

[87] PCT Pub. No.: WO95/15887

PCT Pub. Date: Jun. 15, 1995

[30] Foreign Application Priority Data

Dec. 8, 1993 [BE] Belgium ................. 9301362

[51] Int. Cl.$^6$ .................................................. B65B 31/02
[52] U.S. Cl. ..................................... 53/432; 53/510
[58] Field of Search ................. 53/432, 434, 510, 53/512; 426/419

[56] References Cited

U.S. PATENT DOCUMENTS

| | | |
|---|---|---|
| 3,521,806 | 7/1970 | Esty . |
| 4,000,815 | 1/1977 | Wingbro et al. ............... 53/432 |
| 4,055,931 | 11/1977 | Myers ........................... 53/432 |
| 4,344,467 | 8/1982 | Lahde . |
| 4,894,997 | 1/1990 | Urushizaki et al. ............ 426/419 |
| 4,911,317 | 3/1990 | Schloesser et al. ............ 53/434 |
| 5,028,443 | 7/1991 | Wade .............................. 426/419 |
| 5,111,639 | 5/1992 | Bolejack et al. ............... 53/434 |
| 5,203,138 | 4/1993 | Schuester et al. .............. 53/434 |
| 5,528,880 | 6/1996 | Landolt ......................... 53/432 |

FOREIGN PATENT DOCUMENTS

| | | |
|---|---|---|
| A 2 218 250 | 9/1974 | France . |
| A 2 653 407 | 4/1980 | France . |
| A 29 21 706 | 12/1980 | Germany . |

*Primary Examiner*—Daniel Moon
*Assistant Examiner*—Ed Tolan
*Attorney, Agent, or Firm*—Merchant, Gould, Smith, Edell, Welter, & Schmidt, P.A.

[57] ABSTRACT

A method for inerting packaging covers, particularly industrial packaging covers, wherein the object to be packaged is placed on at least one composite sheet forming a packaging cover (100) which is completely sealed except for at least two apertures (201, 202) used both for extracting the atmosphere contained in the packaging cover and for injecting an inert gas (1), preferably nitrogen, into said cover; the atmosphere contained in the packaging cover is extracted through a first valve sealingly fitted to a first aperture (202), and inert gas is injected through a second valve sealingly fitted to a second aperture (201) in the cover; a parameter related to the relative humidity level within the packaging cover is continuously measured (11); and both the extraction of the atmosphere contained in the packaging cover and the injection of inert gas are stopped once the relative humidity level required by the customer has been achieved. All of the above steps are performed in such a way that a virtual balance is maintained between the pressure inside the packaging cover and the pressure of the surrounding atmosphere.

14 Claims, 2 Drawing Sheets

INERTING PROCESS FOR PACKAGING COVERS AND DEVICES FOR CARRYING OUT SAID PROCESS

OBJECT OF THE INVENTION

The present invention relates to an inerting process for moisture proof packaging covers, a machine and valves for carrying out such a process, as well as such used packaging covers, which are more particularly useful for the industrial packaging of products which can be affected by moisture, oxygen and external pollutions of various types.

In the field of the invention, the term "inerting" relates to any means allowing to put products under an inert atmosphere as above-defined and further detailed below.

PRIOR ART SUSTAINING THE PRESENT INVENTION

Various packaging or storage systems are presently used by packaging or industrial companies. Most currently the items, namely the industrial products, are packed in a strong cover, for example, in non-woven fabrics, the most delicate or the sharpest parts are reinforced by a so-called "bubblepack" or similar materials. Drying agents are put inside the cover in quantities determined by the manufacturers according to the water vapour permeation of the cover and the packaging volume and blocking elements are so positioned to immobilize the product being packed and finally a metallized cover is placed above the whole assembly and a vacuum is applied inside the cover so as to protect the packed piece of equipment. Finally the whole "package" is put into a wood box so as to provide a complete protection of the packed product. This method of packaging or storage has various disadvantages.

First of all, positioning the cover of non-woven fabrics and reinforcing or blocking elements inside the cover requires plenty of labour, which implies costs which are far from negligible. Also the reinforcing elements are expensive and often introduce moisture or other pollutants inside the cover.

Further, the drying agents are rarely heated to be made completely anhydrous and are used as such. Since they are themselves packed in moisture-containing bags, they are already water-saturated when they are put into the cover and reject their excess moisture inside the cover.

Moreover, vacuum is applied through a vacuum pump held by a worker above the cover opening which remains open after the cover has been partially closed and the whole assembly is sealed by another worker with a welding grip. It goes without saying that the vacuum is the assembly is only partial, which implies that moisture and other pollutants remain inside the cover.

Finally the covers existing on the market are relatively porous and let moisture or other pollutants through. Moreover, they are quite thin and easily perforated, which makes them very sensitive to any handling, mainly at the welds.

Further, in case of long-term storage of materials sensitive to moisture or other pollutants, it is necessary at the present time to re-open the covers, to remove the drying agents, to substitute them for new ones and to close the covers again. That requires plenty of labour and time, and possibly material cost when the cover has to be replaced by a new one, without giving any guarantee as for the good condition of the materials contained in the covers.

Other industrial companies, for example in the armament field or the metallurgical industry, send their products to specialized companies who oil them or coat them with oiled paper. After arriving at their destination, the products are sent again to another specialized company where they are unoiled. It is clear that the costs added to the prices of such industrial products are very important.

Further, companies may dip their products into wax. The extreme costs involved to "unwax" the products when they are supposed to be used make the process uneconomical.

Other companies also hold their products in rooms which are especially heated or permanently provided with hot air so as to remove moisture, which is also expensive.

Other companies hold their products in nitrogen-containing containers. The process is convenient, but requires that the items of equipment should have small dimensions so as to be able to be put into the container. Since not all products are sufficiently small, the use of this process is quite limited.

Other companies manufacture reusable tents or covers having more or less the shape of the object to be packed so as to prevent oxidation under continuous air or nitrogen flow. This process is very expensive because the cover used is porous, so there are continuous gas leakages and, because of the porosity of the cover, gas is to be added frequently. This addition of gas is quite expensive and requires machinery, and, the intervention of several workers, consequently increasing the costs.

The inerting process is already known in the foodstuffs field where, for example, nitrogen is injected in sachets containing foodstuffs such as half-baked rice, fresh salad, etc. . . . so as to store ready-to-eat products for a limited time. That inerting system runs continuously and approximately, since the aim is not to store products indefinitely, but just to market fresh consumables. In the period between the production of the fresh product and the consumption thereof, the products are also stored under nitrogen in cabinets provided therefor which are expensive because of their size and their sophisticated equipment to hold an appropriate nitrogen overpressure. Those cabinets are stored in distribution centers for fresh products and the nitrogen injected into the sachets is only used for the instantaneous transportation of products to supermarkets.

In summary, current packaging and storage systems are generally expensive and do not perform well. In a more and more internationalized world, there is a need for a packaging and/or storage system which can hold products in good condition, such as produced by a mill, in whichever country where they are stored or despatched. Moreover, taking customers' pressing requirements into account, packaging should be reliable and cheap, particularly in labour cost. Finally, and this is an important aspect, the nitrogen processing treatment should be done in situ, namely on the yard for industrial items, in the plantation for fresh products like fruit, vegetables, etc. . . .

Apparently, except for containers under nitrogen used mainly by the Army or large institutions for industrial items, or for the large installations used by the producers of fresh products, with the resulting space inconveniences, there has been no previous use of a flexible cover system under nitrogen treated by a performing and cheap machine to inject nitrogen precisely and measuredly so as to store and pack any items for a long period of time, in any place where such a treatment is required.

U.S. Pat. No. 4,344,467 describes a machine which controls continuous oxygen discharge and inert gas filling in any cover. That single discharging/feeding device is inserted into a hole in the cover in a non gas-proof way. Particularly, no system is provided for re-sealing the cover and, inconveniently the final oxygen content is not known precisely. Further, the machine is stationary and is to be used continuously on one packaging cover.

U.S. Pat. No. 3,521,806 relates to a packaging for protecting perishable products such as flowers and foodstuffs. It also describes a device which consists simply in sending an inert gas through a tube which forces the air inside the packaging through another tube without any checking of the atmosphere in the packaging.

FR-A-2 218 250 relates to a process wherein a vacuum is applied in a plastic cover and nitrogen is injected through tyre valves after drying agents have been placed into the cover. Again, neither measurement nor checking more particularly of the relative humidity level inside the cover, is described.

FR-A- 2 653 405 relates an to an industrial packaging wherein forced air circulation is carried out by forcing the inner atmosphere onto drying agents. A stationary machine is described there, which allows thereby to dry the inner atmosphere of the industrial packaging and is started again each time sensors detect a variation of the moisture level.

DE-2 129 706 describes a machine for storing foodstuffs products. That machine is used for storage and transportation as a cabinet of big dimensions. The inner part thereof can be heated or cooled.

SUMMARY OF THE INVENTION

The present invention relates to an inerting process for flexible packaging covers, more particularly for industrial packaging covers, which contain items which can be affected by moisture, oxygen or any other external pollutants.

The present invention aims particularly at a process and device which are simple, economical and easily used on any working site.

The present invention relates to an inerting process and device which allow long-term storage.

The present invention also relates to a process and device allowing the reduction of explosion risks.

The present invention also refers to a machine for carrying out the process according to the invention, which should be particularly simple in design, less expensive and very limited in space.

The present invention also refers to valves which can be adapted directly on the packaging cover in a completely gas-proof way and are used for carrying out the process.

The present invention refers particularly to valves of a simple design which are extremely strong.

Finally the present invention refers to a packaging cover which should be particularly resistant and has particularly very high tensile strength, intitiated tear resistance and puncture resistance.

The present invention relates first to an inerting process, i.e. a process to put items under inert atmosphere, which allows to meet the above-mentioned requirements. The process is convenient for packaging, particularly for industrial packaging and is characterized by the following steps of:

putting the item to be packed on at least one composite sheet as a packaging cover which is totally tightly closed with the exception of two holes, one of which is used to exhaust the inner atmosphere present inside the packaging cover and the other of which is used to inject an inert gas, preferably nitrogen, into said cover, exhausting the inner atmosphere present inside the cover through a first valve adapted with a perfect tightness to a first hole in the packaging cover and injecting an inert gas through a second valve adapted with a total tightness to a second hole in the packaging cover, measuring a parameter associated to the relative humidity level in the packaging cover, completing said exhausting step for the inner atmosphere present inside the packaging cover and said injection step for the inert gas when a predetermined relative humidity level has been reached, all the steps above-described being effected in such a way that the pressure inside the packaging cover is close to an equilibrium with the external atmosphere.

It is to be noticed that the steps of exhausting the inner atmosphere and injecting an inert gas can be carried out either simultaneously or in a successive manner.

When carrying out said steps simultaneously, it is necessary that the flow rates of the inert gas and the inner atmosphere exhausted should be equivalent so that the pressure inside the packaging cover is equivalent or close to the external pressure.

When carrying out said steps successively, more precisely as a cycle, a slight underpressure is first applied by exhausting the inner atmosphere inside the packaging cover and then, when that step is completed, an injection of inert gas is effected so as to compensate for the slight underpressure created inside the packaging cover.

In the latter case, it is necessary to effect respectively said exhaustion/injection cycle until the required relative humidity level is obtained inside the packaging cover.

It is to be noticed that advantageously the two holes for exhausting the inner atmosphere and injecting the inert gas in the packaging cover should be arranged in mutual opposed locations on said cover.

The inerting process can also be improved according to the particular needs of a user. For example, the number of sensors used can be varied to indicate other variables such as pressure, temperature, oxygen, pH, etc. ... or also to indicate on a liquid crystal display not only the immediate values of those variables, but also other graphic time representations according to customers needs. Those variables are important when they have to be adjusted according to other criteria than those above-mentioned for transportation or storage of items with rubber gaskets which could be dried if the atmosphere only comprises nitrogen.

In air transportation of industrial items or artworks, for example, purging elements can be also used, which are inverted valves and are preferably calibrated conveniently so as to compensate for the volume increase inside the cover because of the pressure decrease inside the plane due to altitude. All those improvements are included into the scope of the present invention.

The inert gas used is preferably nitrogen first because it is inert, but also because it is dry and has a drying effect. Of course, other gases could be used according to the present invention depending upon the end use, but nitrogen is the preferred gas for economic and practical reasons.

In the case where rubber gaskets are present, a small quantity of wet nitrogen is injected in order not to dry the gaskets without any moisture being really present. The nitrogen used is an almost pure gas. The case being, for foodstuffs storage, alimentary nitrogen is used. For all those types of nitrogen, L'Air Liquide guarantee no dew point up to −60° C., which avoids any condensation inside the cover.

The actual inerting process is carried out so that the pressure inside the cover is does not move far from equilibrium with the external atmosphere. Possibly, during the process and more particularly when it is carried out as a cycle, a slight underpressure can remain with respect to the external atmosphere, which object is to create an intake of inert gas. That slight underpressure is compensated for by the injection of inert gas.

According to another preferred embodiment, a slight overpressure of the inert gas inside the packaging cover may remain more particularly towards the end of the process so as to counteract any possible penetration of moisture from outside.

Working permanently with a pressure close to the external atmosphere allows the reduction of any explosion risks due to the possible presence of petrol or kerosene for example for the packaging of military items of equipment.

As far as the humidity level is concerned, it depends upon the needs of the end customer. In most cases, a humidity level lower than 30% is required so as to avoid oxidation.

As far as the oxygen level is concerned, which depends of course upon the relative humidity level inside the cover, it is quite low, preferably lower than 0.2% according to a preferred embodiment. This advantageously allows any explosion risks to be limited. Another advantage is that any insects present in the cover are killed with such a low oxygen level.

According to another embodiment, it is required to hold a minimum oxygen level, more particularly in the case of perishable products like fruit.

BRIEF DESCRIPTION OF THE DRAWINGS

The inerting machine as well as the valves used to carry out the present invention will be now described further in detail referring to the accompanying drawings wherein.

DESCRIPTION OF VARIOUS PREFERRED EMBODIMENTS OF THE PRESENT INVENTION

Figure 1:
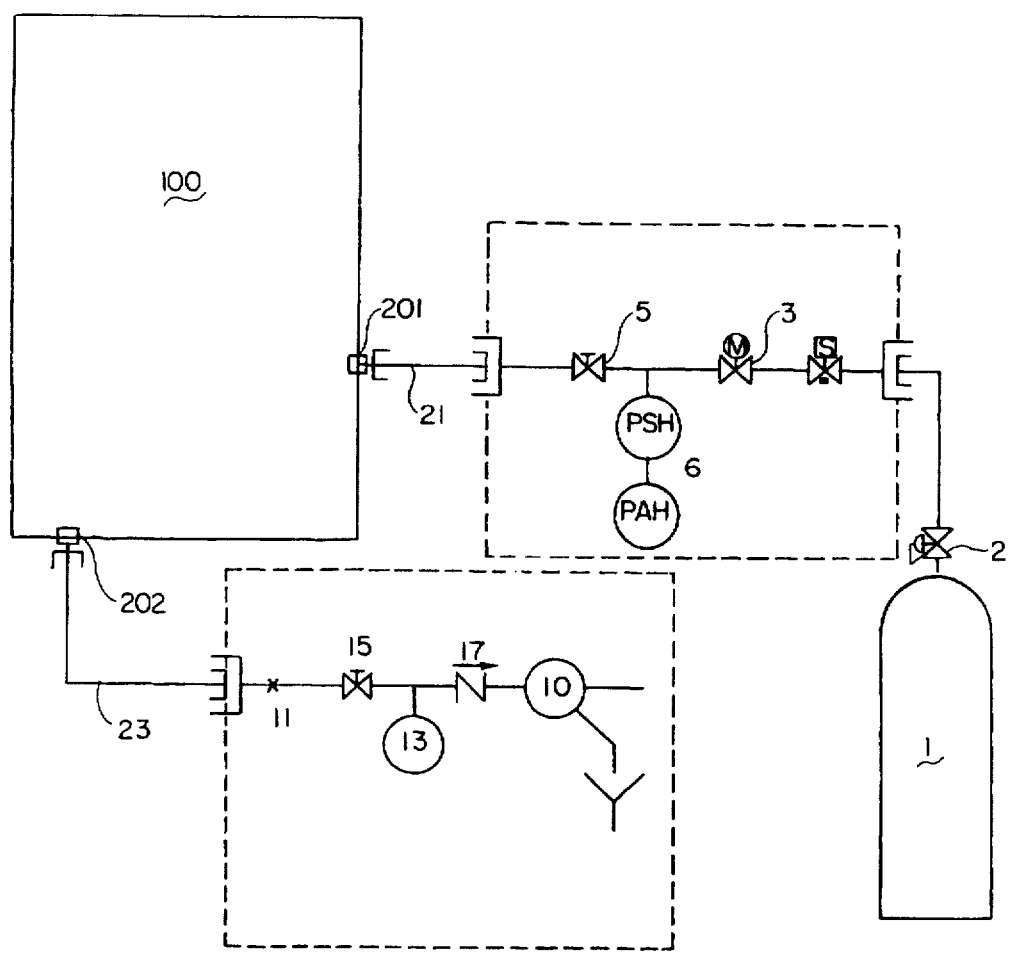
FIG. 1 shows a block diagram of the general structure of the machine.

FIG. 1 shows a block diagram of the general structure of the machine according to the invention. All represented elements are standard components existing on the market.

Referring now to FIG. 1, for the sake of simplicity, two enclosures in broken lines are represented. In fact, both enclosures are normally grouped together into a single unit constituting said machine.

First of all, the enclosure which allows the connection of the source of inert gas (1), in the present case represented by a nitrogen bottle, with the packaging cover (100) will be described. Said nitrogen bottle (1) is provided with a pressure-reducer (2) connected to a valve (3). That valve (3) allows the source of inert gas (1) to be cut off from the packaging cover (100) or possibly to control the inert gas flow rate.

Said valve (3) can be a modulating valve and is particularly advantageous when working in a simultaneous mode. In that case, the valve modulates and controls the inert gas flow rate according to the volume of the atmosphere simultaneously extracted from the cover so that the pressure inside the packaging cover (100) is more or less equivalent to the external atmosphere.

According to another embodiment, more particularly when working in a repetitive cycle mode, the valve can be simply a solenoid valve which controls the opening or closing of the source of inert gas.

Said valve (3) may be connected to an extra valve which is a manual cutoff valve (5).

Moreover a security manometer (6) is also present between the valve (3) and the cutoff valve (5) and allows in case of an overpressure to close an extra valve (4) which is present as a solenoid and is a securing valve.

The cutoff valve (5) prevents the penetration of unwanted particles into the internal tubes during transportation. Said cutoff valve (5) is connected to the packaging cover (100) through a flexible fitting (21) which is secured directly to a tight valve (201) which will be described further in detail.

The second enclosure such as represented in broken lines in FIG. 1 shows the connection of a vacuum pump (10) or other device for creating a slight underpressure with the packaging cover (100). The vacuum pump (10) or equivalent device is connected with a flow rate controlling valve bearing the reference (15). Said valve (15) is connected with a non-return valve (17) via a pressure transmitter (13) which, on the basis of the principle of strength gauges, supplies a signal (4 to 20 mA or 0 to 10 V) corresponding to the pressure present in the packaging cover (100).

The control valve (15) is connected with the cover (100) through a flexible fitting (23) which is secured to a valve (202) which will be further described in detail.

A moisture sensor (11) is present between the cover (100) and the control valve (15).

According to a preferred embodiment, said moisture sensor (11) may be integrated directly into the valve (202) such as described below.

The measurements given by the moisture sensor (11) and the pressure transmitter (13) define either the opening degree of the valve (3) when it is a modulating valve, or the opening time of said valve (3) when it is a solenoid valve, through a programmable controller.

The non-return valve (17) allows, at the end of the substitution of an inert gas for air, to cut off automatically the inner atmosphere inside the packaging cover (100) from the external atmosphere by cutting it off from the vacuum pump (10) or any equivalent device. Thus, by closing that non-return valve (17), a measurement of pressure and relative humidity is made which reflects the atmosphere inside the packaging cover (100). The non-return valve (17) operates automatically at the end of each substitution of exhausted air by an inert gas. For larger periods of time, an additional manual valve may be required. It is to be noticed that the flow rate of the vacuum pump (10) can be modified depending upon the items to be packed. In most cases, an average flow rate of 35/65 m³ per hour is sufficient. In that case, a regular packaging operation will take a few minutes.

The programmable controller present on the front side of the machine for carrying out the process according to the invention is known and will not be described further.

The machine is different from conventional machines marketed because it has no injection pump and the pressure-reducer of a nitrogen bottle being used as an injector will be controllable at a given pressure, for example 6 or 8 bar, quite easily. The machine has a small size and can be easily transported in a van to any yard, which is not the case with prior art machines.

Moreover, the machine according to the invention is inexpensive and can be within easy reach of many middle-size companies or producers, which is also not the case with prior art machines. Finally, the existing machines are almost exclusively manufactured for foodstuffs whereas the machine according to the present invention has a more versatile use, mainly in the packaging field for industrial products. To summarize, the machine according to the invention is practical, less bulky, simple in design and cheap.

The valves used are especially designed valves according to the present invention which can be secured simply to the cover material. Said valves simply permit the application of a slight underpressure by air exhaustion or injection or an inert gas such as nitrogen into a tight enclosure which is a packaging cover. They are generally made of a plastic such as PVC, Teflon or another material of the same type for economical reasons, but may also formed with other appropriate materials.

Figure 2:
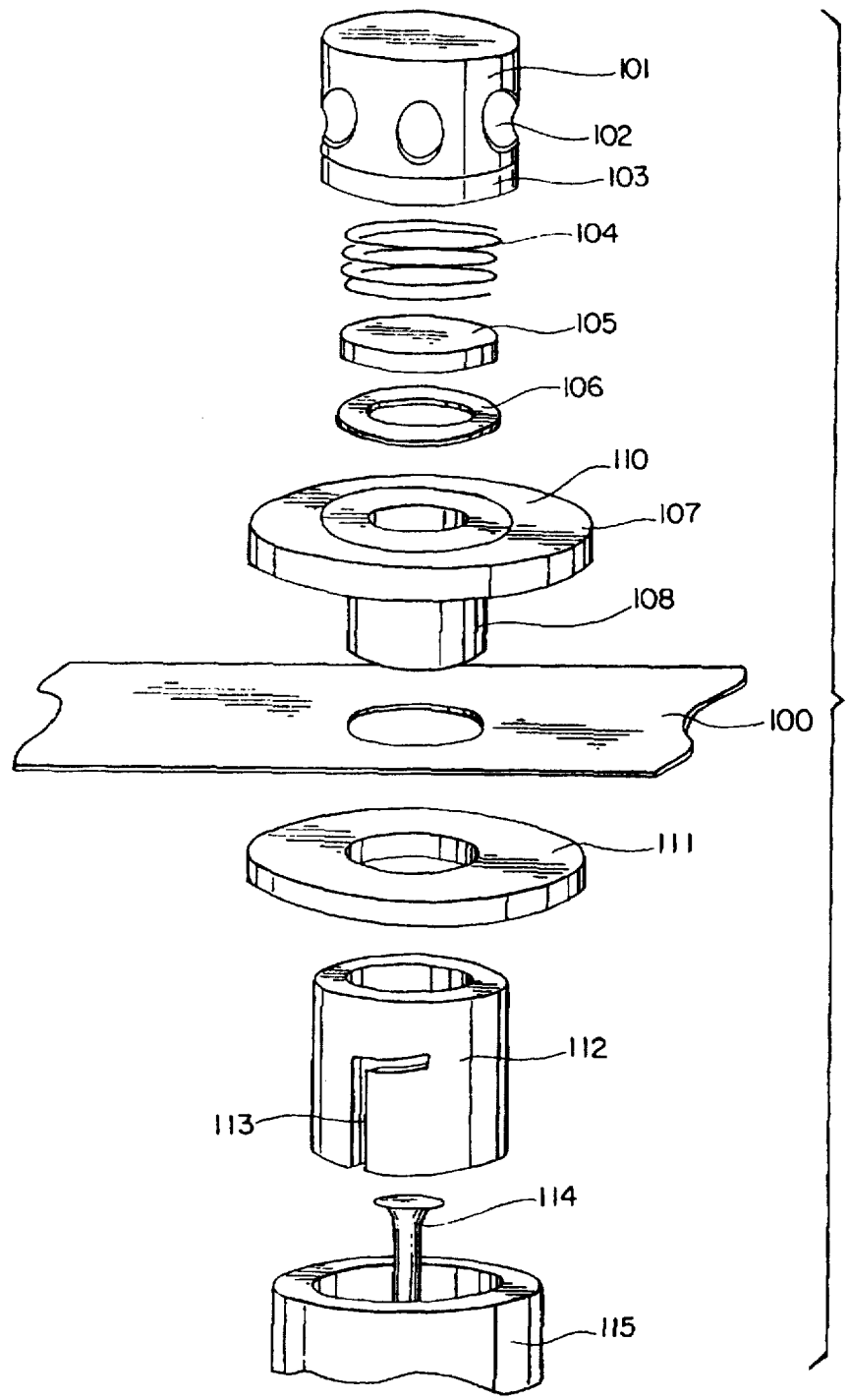
FIG. 2 represents an exploded view of a valve according to the invention.

The valve according to the invention is represented in FIG. 2. The valve (201 or 202) comprises generally a body formed with various elements to be assembled beforehand, namely a diffuser (101), a spring (104), a plug provided as a circular plate, an O-ring (110) preferably in rubber or a convenient plastic, and a circular ring (109) to allow a tight securing into the hole of the packaging cover (100).

The diffuser (101) is shaped as a short cylindrical tube the wall of which presents, regularly distributed on the periphery thereof, four circular holes (102) sufficiently large to allow the application of an underpressure or the injection of inert gas. The diffuser (101) is threaded externally on its lower part. The diffuser (101) is designed to be secured to the ring (109) which has itself on its upper part a circular recess (106) internally threaded which receives the diffuser (101) by screwing. To enhance the tightness of the assembly, an O-ring (110) may be placed into the circular recess (106) between the diffuser (101) and the ring (109). It is held in position and slightly crushed when the diffuser (101) is screwed to the ring (109), ensuring thereby a perfect tightness.

Before assembling the diffuser (101), the O-ring (110) and the ring (109), the spring (104) and the circular plate serving as a plug (105) will be put into the diffuser (101) in the sequence of steps indicated in FIG. 2.

The ring (109) is generally formed with a circular flange (107) on the upper part thereof—which has the internally threaded circular recess (106) above mentioned—and a short tube part (108) of lesser diameter on its lower part. Said short tube part (108) is designed to go through the hole bored in the cover (100) through a punch. Said short tube part (108) is externally threaded to be screwed on a nut (111) which is arranged on the other side of the cover (100). Said nut (111) is ring-shaped with approximately the same diameter than the circular flange (107) of the ring (109) and is provided with a central internally threaded hole to be screwed on the short tube part (108). Said short tube part (108) goes slightly beyond the nut (111) which object is to secure the packaging cover (100).

The assembling of the whole system is quite easy just by screwing. Moreover the valve takes little room and merges tightly with the cover.

Together with the above-described valve, two elements have been developed which complete the valve and assure a better performance of it. A short sleeve (112) internally threaded at one end can be screwed to the short tube part (108). Said sleeve (112) is an intermediate part between the valve and a tip (115) of a flexible fitting leading to either the nitrogen bottle or the vacuum pump. The sleeve (112) is not supposed to stay on the valve, because this latter would project too much outside and could be caught by various objects during the packaging, which could damage the valve and possibly break the cover sealing. The sleeve (112) may be removed each time and can be re-used various times.

The joint between the sleeve (112) and the tip (115) should provide a tightness between the elements and assure a quick release without too much loss of tightness. It is made with a wedge system. The external surface of the sleeve (112) is slightly tapered, the part turned to the cover having the biggest diameter. The inside of the tip (115) has the same tapering, which allows to give a better tightness when both parts are fitted into each other. The sleeve (112) has a groove (113) which is, in a first part as shown in FIG. 2, parallel to the sleeve axis on a distance of a few centimeters, making afterwards an angle of +/−100° downwards with respect to the axial direction clockwise so as to form a holding part. When both elements are fitted into each other, a convenient tightening is obtained by engagement of a lug projecting from the inner wall of the tip (115) into the groove (113). So doing, the tip (115) is pressed onto the sleeve (113) and, when it reaches its path end, it is rotated clockwise until the internal and external surfaces of the tip (115) and the sleeve (112) bear against each other.

Moreover, a metal rod (114) projects from the tip (115) on a determined length, said length being such as, when the tip (115) is secured to the sleeve (112), the tip end oriented towards the valve bears against the spring plate (105) to press on the spring (104). In order to help for the pushing movement, the end of the rod (114) oriented towards the valve has a flared shape which allows it to bear efficiently onto the circular plate (105), at the center thereof. The metal rod (114) is thin enough on most of its length so as not to disturb the gas flow going through, but care is taken to avoid any risk of buckling said rod (114) when placed under compression.

When the tip (115) is plugged and secured to the sleeve (112) as above-mentioned, the rod (114) pushes onto the circular plate (105) and brings it up to the end of its path at the bottom of the diffuser ((101), unveiling thereby the four holes (102) provided in the wall of the diffuser (101). Consequently, the path is free to inject nitrogen or to apply a vacuum. When the operation is completed, the tip (115) is unfastened, the spring expands and brings back the circular plate (105) to its starting point, masking thereby the four holes (102) and sealing the cover (100).

When the tip (115) is moved anticlockwise to disconnect it from the sleeve (112), the diffuser spring expands, forcing the rod (114) out, which allows an extremely quick disconnection of the tip (115) and an almost instantaneous sealing of the cover, resulting in almost no loss of gas and, generally speaking, a perfect sealing, keeping a gas equilibrium inside the cover (101).

The tip (115) may be incorporated into the flexible fitting leading to the vacuum pump or to the nitrogen bottle. It may also be an independent item to be connected with the tips of such fittings. In the case of materials to be regularly checked, the tip (115) can be connected with the tip of a moisture sensor.

The spring (104) is dimensioned so as to resist pressure differences between the inside and the outside of the cover (100) of about 1 bar or slightly less.

The pressure of injected nitrogen alone, between 6 and 10 bar, could press on the spring (104), open the plug (105) and allow the operation of the valve and that option is included into the scope of the invention. However, generally speaking, the described system is preferred because it allows the passage of the gas flow with neither slipstream nor development of forces due to the pressure by a simple mechanical action. Moreover, in the case of the second valve connected to the vacuum pump, the pressure being directed on the opposite direction from the nitrogen pressure, the mechanical system developed in the valve according to the invention allows the use of the same valve for two different operations i.e., injection and exhausting.

Both complementary elements formed by the sleeve (112) and the tip (115) are made of plastic or metal, and the rod (114) is made of metal in order to guarantee higher strength.

The sleeve (112) and the corresponding tip (115) may also be formed integrally according to another embodiment on condition that the valve can be activated by a rod system as above described or in any other way.

That will be the case mainly when any sensor (humidity, pressure, temperature, etc.) is connected with the valve for checking long-term stored products.

Finally, the valve according to the invention can be used as a purge when it is reversed, that is to say with the diffuser (101) outside the cover (100). In that case, the spring (104) arranged inside the diffuser (101) is calibrated more or less at one bar when working at equipressure or at a higher value when working with a slight overpressure. The reversely mounted valve is important in the case of air transportation of products. The package material is loaded in the storerooms of cargo planes. Those store-rooms are airconditioned but unperfectly so that during the flight, the pressure decrease in the store-room leads to a cover inflation which may lead to the cover bursting. In that case, the valve according to the invention operates as a purge to exhaust the excess nitrogen to the outside, even if the cover is to be reinflated at the destination.

The diffuser (101) is so called because of its diffusing action which spreads nitrogen regularly in all directions, leading inside the cover (100) to slipstreams which remove moisture from all places within the cover (100), assisted therefor by the action of the vacuum pump. Moreover, if one and/or both valves are to be recovered, it is possible, as above mentioned, to secure them to extension parts to be cut subsequently. The side arrangement of the holes (102) allows the valves to do their job whereas normal valves with lengthwise flow cannot work because they would be pushed against the extension wall, which would prevent the nitrogen flow from entering normally the extension part and would lead to the breaking thereof. In the case of the valve connected with the vacuum pump, the extension part would be pushed against the vacuum hole and the action of the vacuum pump would be cancelled, which could lead to an overheating of the vacuum pump.

Said valves are preferably used by two diagonally arranged valves so as to help the nitrogen movement and removal of moisture throughout the cover. Once the operation is performed, the valves may not necessarily remain on the cover, except in case of storage where one valve is left to permit the nitrogen atmosphere to be checked using a moisture sensor integrated into one of the valves during the checks. Removal of the valve(s) from the cover is quite simple. It is sufficient to fit the valve on a projecting extension part provided on the cover and to weld that projection which is then cut. As the valves can be partially recovered, this reduces the handling costs.

Although the quick connection system of the tip to the valve is described particularly in the description and the drawings, the invention also aims at using any system implementing a rod pushing onto a plate against a spring effect and other variations, taken separately or together, will be used without departing from the spirit and scope of the invention.

The present invention also covers the use of a sensor, more particularly a capacitive sensor, which permits the measurement of the relative humidity level inside the cover. Said sensor is preferably integrated into the above described valve. According to that embodiment, it may be preferred to leave the sensor in the valve once the inerting process for the packaging cover has been completed. In such a way measurements of the relative humidity level inside the packaging cover may be made throughout the whole storing period.

It is to be noticed that the storing period may be almost indefinite on condition that the materials under cover are regularly checked and the covers are not manipulated.

Nowadays for long term storage, conditioned or dry premises are provided. Within the scope of the invention, storage can be made anywhere, even outside under a shed by taking simple precautions.

The concept above explained requires, covers of good quality which prevent moisture from entering the cover to be efficient.

Some products have been found particularly convenient therefor; they are formed with at least XF film between 70 and 300 gsm, an aluminum foil or EVOH or another material convenient to improve the gas-tightness, particularly a water vapor tightness, and any other product to improve the aspect, including another XF film between 70 and 300 gsm.

The XF is a biaxially stretched laminated film of polyolefins in three or four plies, the central part of which, being present at 70–80%, comprises a mixture of olefins so as to obtain, by laminating and stretching, an interlocked arrangement which gives a higher strength.

XF film can thus be considered as a triaxial or quadriaxial film.

Preferably, XF film is a film comprised between 70 and 180 gsm. This grade can be used in overpressure or in equipressure according to the needs.

The present invention also relates to all products manufactured with films similar to XF film.

Examples of convenient products include more particularly the products marketed under the trademarks MILPAC 113, MILPAC 113 Plus, MILPAC 143 and MILPAC 153, amongst others, described further in details below.

EXAMPLE 1

MILPAC 113: a laminate as follows:
17 gsm metallized polyester
20 gsm PEBD
54 gsm aluminum foil
40 gsm PEBD
150 gsm XF film

EXAMPLE 2

MILPAC 113 Plus: a laminate as follows:
17 gsm metallized polyester
20 gsm PEBD
70 gsm XF film
20 gsm PEBD
54 gsm aluminum foil
40 gsm PEBD
90 gsm XF film

EXAMPLE 3

MILPAC 143: a laminate as follows:
17 gsm metallized polyester
20 gsm PEBD 26 gsm aluminum foil 40 gsm PEBD 70 gsm XF film

EXAMPLE 4

MILPAC 153: a laminate as follows:

17 gsm metallized polyester 20 gsm PEBD 26 gsm aluminum foil 40 gsm PEBD 90 gsm XF film Those different products which form the cover according to the present invention are manufactured by a process wherein each layer is secured to the other by extrusion and not by glue laminating. In that latter technique, the glue frequently becomes fragile when welding at high temperature, so creating a weakening zone which shows a poor welding peel strength.

In order to highlight the specific particularities and the advantages obtained by using the products according to the present invention, comparisons have been made with conventional products which comprise:

Product A:

GM24 (Rhône-Poulenc) formed as follows:

polyester aluminum linear polythene wherein the bindings between the successive layers are made by glue laminating.

Product B:

VACUMATIC (Brangs+Heindrich) formed as follows:

polyester aluminum

Valeron wherein the bindings between the successive layers are made by glue laminating.

Product C:

VALSEM S165 (SNEC) formed as follows:

polyester aluminum

Valeron wherein the bindings between the successive layers are made by glue laminating.

Product D:

Moistop 662 formed as follows:

polyester aluminum linear polythene wherein the bindings between the successive layers are made by glue laminating.

As shown in the following tables, the conventional products are made either with linear polythene, which has no initiated tear resistance, or with a Valeron layer which is a flat biaxially-oriented film formed with two films having interleaved fibers.

Table I shows the welding peel strength for weldings effected by heated welding grips in two conditions:

Condition (1): a temperature of 190° C. for 3 sec at a pressure of 3 bar

Condition (2): a temperature of 170° C. for 2 sec at a pressure of 3 bar

TABLE I

|  | Condition (1) | Condition (2) |
|---|---|---|
| MILPAC 143 | 48.96N | 99.28N |
| MILPAC 153 | 94.65N | 73.35N |
| MILPAC 113 | >110N | >110N |
| MILPAC 113+ | >110N | >110N |
| PRODUCT A | 61.48N | 76.28N |
| PRODUCT B | 47.75N | 41.10N |
| PRODUCT C | 78.13N | 75.20N |

Table II shows peel and tensile strength for pulse weldings.

TABLE II

|  | Peel | Tensile |
|---|---|---|
| MILPAC 113 | 107.1N | 151.9N |
| MILPAC 113+ | 102N | 177N |
| PRODUCT A | 82.2N | 148N |
| PRODUCT B | 45N | 123.1N |
| PRODUCT C | 73N | 137N |
| PRODUCT D | 47.3N | 101.7N |

Table III shows initiated tear resistance (BS 2782 standard) either in the machine direction or crosswise.

TABLE III

|  | Machine direction | Crosswise |
|---|---|---|
| PRODUCT A | 1.35N | 2.18N |
| PRODUCT B | 8.49N | 4.55N |
| PRODUCT C | 8.79N | 6.12N |
| PRODUCT D | 1.77N | 1.34N |
| MILPAC 143 | 11.51N | 10.41N |
| MILPAC 153 | 10.81N | 12.94N |
| MILPAC 113 | 29.12N | 50.16N |
| MILPAC 113+ | 23.73N | 22.95N |

Table IV shows the dynamical puncture resistance.

TABLE IV

|  | Puncture resistance |
|---|---|
| PRODUCT A | 1.8 |
| PRODUCT B | 2.6 |
| PRODUCT D | 1.3 |
| MILPAC 143 | 2.8 |
| MILPAC 153 | 3.5 |
| MILPAC 113 | 4.5 |
| MILPAC 113+ | 7.5 |

Moreover, the method of manufacturing and the flexibility of the XF film make the MILPAC products particularly flexible and consequently provide a perfect substrate for the aluminum foil which is not damaged even if the product is creased or folded.

The products according to the present invention combine advantageously and surprisingly the following characteristics:

welding peel strength initiated tear resistance puncture resistance integrity of the aluminum foil Moreover, the MILPAC products have a better gastightness, in particular a better vapor tightness, with respect to the prior art products.

Table V describes the water vapor transmission level for prior art products and products according to the invention.

TABLE V

| | Water vapor transmission (g/m²/24 h) |
|---|---|
| PRODUCT B | 0.06 |
| PRODUCT C | 0.05 |
| MILPAC 113 | 0.008 |
| MILPAC 143 | 0.001 |
| MILPAC 153 | 0.007 |

We claim:

1. A device for inerting a packaging cover, comprising:

an injection portion including a source of an inert gas provided with a pressure reducer connected through a first valve to control inert gas injection into the packaging cover, said first valve being connected through a first flexible fitting to the packaging cover through a first tight valve secured through a first aperture in the packaging cover;

an exhaustion portion including a vacuum pump to create a slight underpressure in the packaging cover, connected with said packaging cover through a second flexible fitting, a flow rate control valve, a non-return valve and a second tight valve, the second tight valve being secured in a second aperture in the packaging cover; and a moisture sensor positioned in the exhaustion portion of the device to measure a parameter related to relative humidity within the packaging cover.

2. A device according to claim 1, wherein the first and second valves each include a body formed with a diffuser at one end of the body, a spring retained within the body by the diffuser and applied onto a plug formed with a circular plate, an O-ring, said circular plate sealable against the O-ring under force from the spring, and a circular ring for securely attaching the valve to the packaging cover.

3. A device according to clam 2, wherein the diffuser is shaped as a short cylindrical tube having a wall which presents, regularly distributed on the periphery thereof, at least four circular holes permitting application of a vacuum or injection of an inert gas, the diffuser being threaded externally on a lower part for mounting on the ring, the ring having on an upper part a circular recess internally threaded to receive the diffuser by screwing.

4. A device according to claim 3, wherein the O-ring is secured into a circular recess between the diffuser and the ring and is held in position and slightly compressed when the diffuser is screwed to the ring to produce a seal.

5. A device according to claim 1, wherein one of the first and second tight valves secured to the packaging cover includes an element for direct connection with a moisture sensor.

6. A device according to claim 1, wherein the moisture sensor is integrated into the second tight valve in the exhaustion portion.

7. An inerting process for a packaging cover, including an industrial packaging cover, the packaging cover covering an item, the process comprising:

enclosing the item within at least one composite sheet to form the packaging cover, the composite sheet being tightly sealed and having two apertures;

measuring a parameter associated with a level of relative humidity within the packaging cover;

exhausting gas from within the packaging cover through a first valve sealed in one of the apertures in the composite sheet and injecting an inert gas into the packaging cover through a second valve sealed in the other of the apertures in the packaging cover until the level of humidity within the packaging cover has fallen below a predetermined level; and maintaining a pressure within the packaging cover to be close to equilibrium with an external atmospheric pressure while exhausting the gas and injecting the inert gas.

8. An inerting process as recited in claim 7, wherein the steps of exhausting and injecting are carried out consecutively.

9. An inerting process as recited in claim 7, further comprising repeating the steps of exhausting and injecting until the level of relative humidity within the packaging cover has reached the predetermined level.

10. An inerting process as recited in claim 7, wherein the steps of exhausting and injecting are carried out simultaneously.

11. An inerting process as recited in claim 7, wherein the apertures are provided at mutually opposing locations in the packaging cover.

12. An inerting process as recited in claim 7, comprising the further step of sealing the packaging cover once the level of relative humidity within the packaging cover has fallen below the predetermined level.

13. An inerting process as recited in claim 7, wherein the predetermined level of relative humidity level is 30%.

14. A device as recited in claim 1, wherein the first and second apertures are provided at mutually opposing locations in the packaging cover.

* * * * *